US012778852B2

(12) United States Patent
Kim et al.

(10) Patent No.: US 12,778,852 B2
(45) Date of Patent: Nov. 3, 2026

(54) OPERATING BOTTLE WITH AUTOMATIC ORIENTING HANDLE ASSEMBLY

(71) Applicant: COMOTOMO 2022 INC., Sunnyvale, CA (US)

(72) Inventors: Sang Pyo Kim, Los Altos, CA (US); Yong Hyun Kyung, Incheon (KR)

(73) Assignee: Comotomo 2022 Inc.

( * ) Notice: Subject to any disclaimer, the term of this patent is extended or adjusted under 35 U.S.C. 154(b) by 505 days.

(21) Appl. No.: 17/856,779

(22) Filed: Jul. 1, 2022

(65) Prior Publication Data

US 2024/0000666 A1 Jan. 4, 2024

(51) Int. Cl.

*A61J 9/06* (2006.01)
*A61J 9/08* (2006.01)
*A61J 11/00* (2006.01)

(52) U.S. Cl.

CPC ........... *A61J 9/0623* (2015.05); *A61J 11/008* (2013.01)

(58) Field of Classification Search

CPC ........... B65D 2525/285; A47G 19/2272; A61J 9/0623; A61J 9/085; A61J 11/008
See application file for complete search history.

(56) References Cited

U.S. PATENT DOCUMENTS 3,982,651 A 9/1976 Braun et al.
6,959,827 B2 11/2005 Morano et al.
10,117,533 B2 11/2018 Chen et al.
2005/0056614 A1 3/2005 Morano
2017/0320640 A1 11/2017 Steinmann
2022/0212843 A1 7/2022 Egorov et al.

FOREIGN PATENT DOCUMENTS

CN 105411861 A * 3/2016
CN 205286969 U * 6/2016
JP 2018-000603 A 1/2018
JP 6321969 B2 * 5/2018
JP 3219375 U * 12/2018 ............... B65D 1/24
KR 200478494 Y1 * 10/2015
KR 10-1852395 B1 6/2018
KR 20-2020-0000153 U 1/2020

(Continued)

OTHER PUBLICATIONS

KR_200478494_Y1_I_translation.pdf (Year: 2015).*

(Continued)

*Primary Examiner* — Allan D Stevens
(74) *Attorney, Agent, or Firm* — WTA IP Law P.C.

(57) ABSTRACT

Embodiments relate to a self-orienting handle assembly that is oriented in a predetermined direction relative to a lid when the lid is screwed onto a container. The handle assembly includes a locking structure that locks onto a counterpart locking structure of the lid as the lid is screwed onto the container. The locking structure may include at least one of a protrusion or a notch, and the counterpart locking structure may have an inverse shape. When the lid is screwed onto the container, the locking structure engages the counterpart locking structure and cause the handle assembly to rotate with the lid. When the lid is screwed onto the container, the locking structure locks onto the counterpart locking structure, and thereby prevents the handle assembly from rotating relative to the lid.

18 Claims, 15 Drawing Sheets

(56) References Cited

FOREIGN PATENT DOCUMENTS

| | | | |
|---|---|---|---|
| KR | 10-2021-0029311 | A | 3/2021 |
| KR | 10-2318570 | B1 | 10/2021 |
| KR | 20-2021-0002322 | U | 10/2021 |
| KR | 10-2022-19688 | A1 | 2/2022 |
| KR | 200495525 | Y1 | 6/2022 |
| WO | WO 2020/227752 | A1 | 11/2020 |
| WO | WO 2021/014593 | A1 | 1/2021 |

OTHER PUBLICATIONS

International Search Report of PCT/US2023/025100 mailed on Oct. 11, 2023.
Extended European Search Report of the corresponding EP Application No. 23832127.7 mailed on Jul. 3, 2025.

* cited by examiner

OPERATING BOTTLE WITH AUTOMATIC ORIENTING HANDLE ASSEMBLY

BACKGROUND

1. Field of Art

The disclosure relates to a drinking bottle, more specifically to a drinking bottle with a handle assembly that automatically orients itself relative to a lid when the lid is assembled.

2. Description of the Related Art

Bottles with handles are often used by babies or children. Although attempts have been made to shape bottles for easier handling by babies or children, they generally lack the power or dexterity to adequately hold the bottles without assistive structures. Handles are often provided as such assistive structures so that babies or children may grab these handles without dropping the bottles. These handles may be attached to a ring that is inserted into the outer periphery of the body of the bottle so that the handles may be removed from the container for cleaning purposes. As the handles are reattached to the body of the bottle, their orientation may change or shift. In a bottle with an asymmetric top structure where a spout or a straw is shifted away from its axial center (e.g., towards the front of the bottle), such change or shift in the orientation of the handles may require manual readjustment so that the handles are appropriately oriented for handling by the babies or children.

SUMMARY

Embodiments relate operating a drinking bottle where a first portion of a container with an open top is received in a ring of a handle assembly. The first portion has a first outer diameter. A second portion of the container slidably engages with the ring of the handle assembly. The second portion has a second outer dimension larger than the first dimension and further away from the open top than the first portion. The handle assembly includes at least one handle attached to the ring. In a lid, the first portion of the container is received but not the second portion of the container. A first protrusion of a ring engages with a first notch of a lid by rotating the lid relative to the handle assembly.

In one or more embodiments, an inner dimension of the ring is larger than the first outer dimension but smaller than the second outer dimension.

In one or more embodiments, the lid is secured to the container with the ring between the lid and the second portion by rotating the lid relative to the container.

In one or more embodiments, the lid is secured to the container by engaging a first screw of the first portion with a second screw of the lid.

In one or more embodiments, a second protrusion of the lid engages with a second notch of the ring. The second notch is pushed by the second protrusion to rotate the ring and release the ring and the lid from the container.

In one or more embodiments, an internal surface of the ring is smooth.

In one or more embodiments, the ring comprises a second protrusion at an opposite side of the first protrusion, and the lid comprises a second notch that corresponds to the second protrusion at an opposite side of the first protrusion.

In one or more embodiments, an insert is assembled into a cavity in the lid, the insert made of resilient material to provide sealing between the open top and the lid.

In one or more embodiments, the insert includes a top portion, a middle portion and a bottom portion. The top portion has an outer surface that is reverse tapered. The outer surface of the top portion engaging and resting on a forward tapered inner surface of the cavity in the lid. The middle portion is attached to the top portion and has an outer surface that is forward tapered. The bottom portion is attached to the middle portion. The edges of the bottom portion are captured between an inner annular rib of the lid and the open top of the container.

In one or more embodiments, at least a part of the insert is compressed between the lid and a lid cover hinged to the lid by closing the lid cover.

In one or more embodiments, the lid cover is locked in a first position by a lever attached to the lid. The lid cover is released in a second position. The lid cover rotated away from the lid by a compressive force of the insert when the lever is placed in the second position.

In one or more embodiments, the lever comprises a pair of latch for securing the lever to the lid.

In one or more embodiments, biasing force is applied to the lever by the insert to maintain the lever in the first position when external force is not applied to the lever.

In one or more embodiments, content in the container is accessed via a straw or a spout that is folded or compressed by a housing of the lid cover when the lid cover is closed.

In one or more embodiments, a compressive force is applied to open the lid cover by the straw or the spout.

In one or more embodiments, a protrusion of the lid is compressed by the lid cover when the lid cover is closed. An opening force is applied to the lid cover by the protrusion when the lever is placed in the second position.

Embodiments also relate to operating a drinking bottle where a lid is rotated relative to a container. The lid and a handle assembly are engaged by mating a first pair of protrusion and notch of the handle assembly with a second pair of protrusion and notch of the lid, the second pair inverse in shape relative to the first pair. The handle assembly is rotated with a rotation of the lid when the lid and the handle assembly engage. The first pair and the second pair are locked into position when the handle assembly is rotated with the rotation of the lid.

In one or more embodiments, the lid is screwed onto the container with the handle assembly between the lid and the container while a distance between the first pair and the second pair in a longitudinal direction of the container is gradually reduced as the lid is screwed onto the container.

In one or more embodiments, an inner surface of the lid comprises a first screw and an outer surface of the container comprises a second screw that mate with the first screw.

In one or more embodiments, an insert of resilient material is assembled onto the lid. A lid cover is locked in a first position responsive to a lever attached to the lid receiving biasing force from the insert when external force is not applied to the lever. The lid cover is released into a second position responsive to the lever receiving the external force.

DETAILED DESCRIPTION OF EMBODIMENTS

Figure 1:
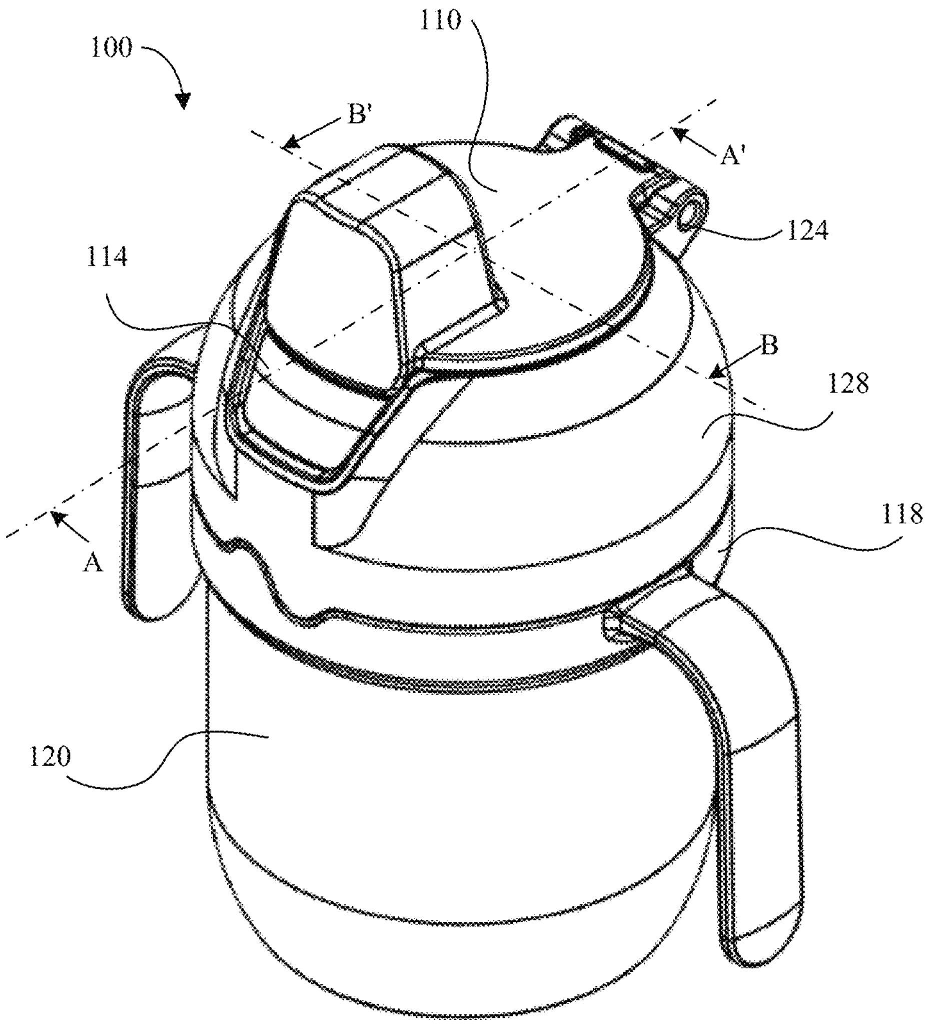
FIG. 1 is a perspective view of a drinking bottle with a lid cover closed, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements. The shape, size and regions, and the like, of the drawing may be exaggerated for clarity.

Embodiments relate to a self-orienting handle assembly that is oriented in a predetermined direction relative to a lid when the lid is screwed onto a container. The handle assembly includes a locking structure that locks onto a counterpart locking structure of the lid as the lid is screwed onto the container. The locking structure may include at least one of a protrusion or a notch, and the counterpart locking structure may have an inverse shape. When the lid is screwed onto the container, the locking structure engages the counterpart locking structure and causes the handle assembly to rotate with the lid. When the lid is screwed onto the container, the locking structure locks onto the counterpart locking structure, and thereby prevents the handle assembly from rotating relative to the lid.

FIG. 1 is a perspective view of a drinking bottle 100 with a lid cover 110 closed, according to one embodiment. Drinking bottle 100 includes a container 120 and other parts assembled onto container 120. In the embodiment of FIG. 1, drinking bottle 100 is of a cylindrical shape but drinking bottle 100 may be of various other shapes.

Parts that are assembled onto drinking bottle 100 may include, among other components, handle assembly 118 and lid 128. Handle assembly 118 and lid 128 are screwed onto drinking bottle 100 with a predetermined relationship due to locking structures. That is, when handle assembly 118 and lid 128 are assembled onto drinking bottle 100 by screwing lid 128 onto drinking bottle 100, handles 338A, 338B (collectively referred to as "handles 338" or also individually referred to as "handle 338") of lid 128 are oriented in a direction that is perpendicular to a direction in which straw 322 or spout 1208 is shifted relative to the center axis of container 120.

Figure 2:
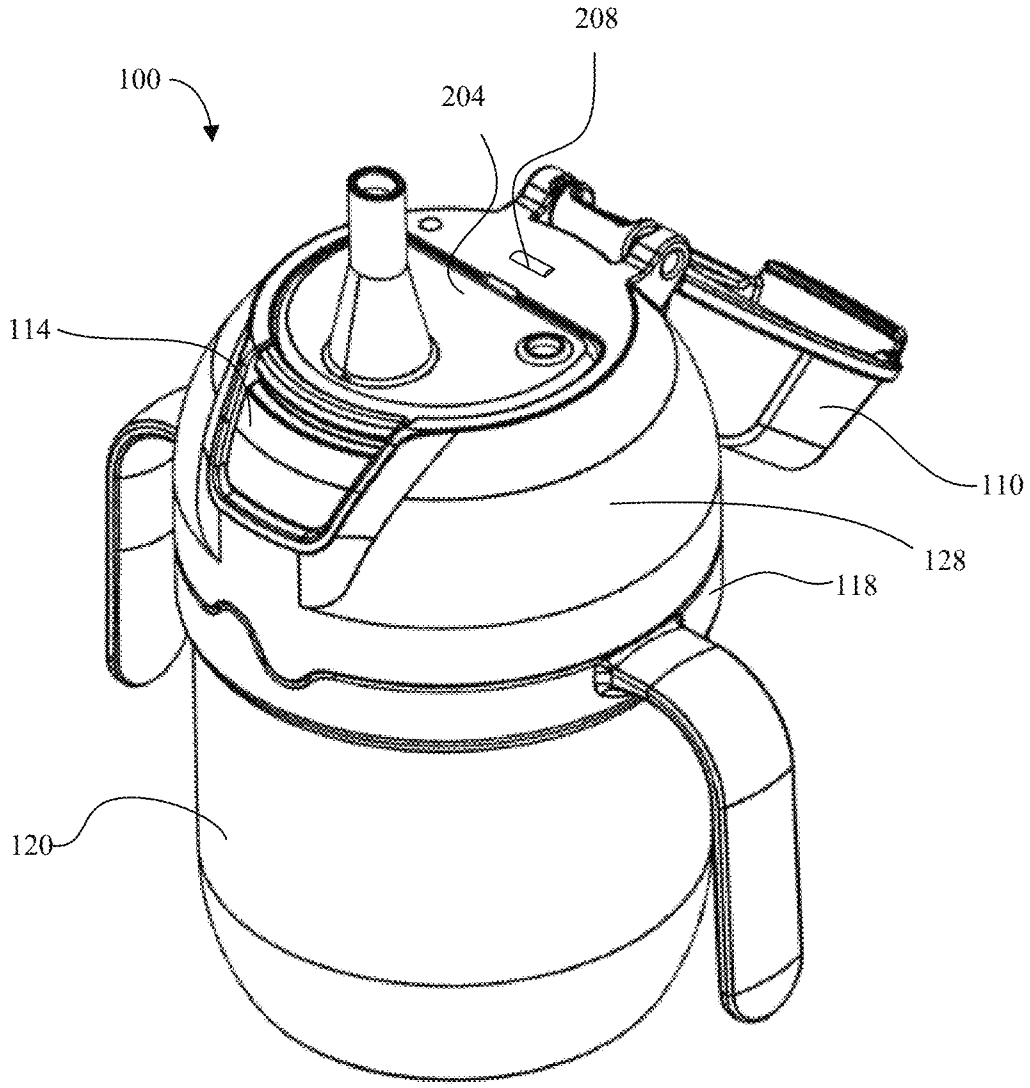
FIG. 2 is a perspective view of the drinking bottle with the lid cover opened, according to one embodiment.

FIG. 2 is a perspective view of drinking bottle 100 with lid cover 110 opened to reveal insert 204, according to one embodiment. Lid cover 110 are coupled to lid 128 via hinges 502 in a rotatable manner between a first state (e.g., closed state, as shown in FIG. 1) and a second state (e.g., open state as shown in FIG. 2). When in the open state, insert 204 is revealed and accessible to the user of drinking bottle 100. The switch to the open state may be facilitated by protrusion 208 formed on the top surface of lid 128 as well as the compressive force applied by straw 322 or spout 1208, as described below in detail with reference to FIGS. 12A through 12D.

When in use, a user holds one or both of handle 338A, handle 338B, and accesses straw 322 or spout 1208 that is part of insert 204. In the closed state, a lever 114 engages lid cover 110. In the open state, lever 114 releases lid cover 110 and enables lid cover 110 to rotate away as shown in FIG. 2.

Figure 3:
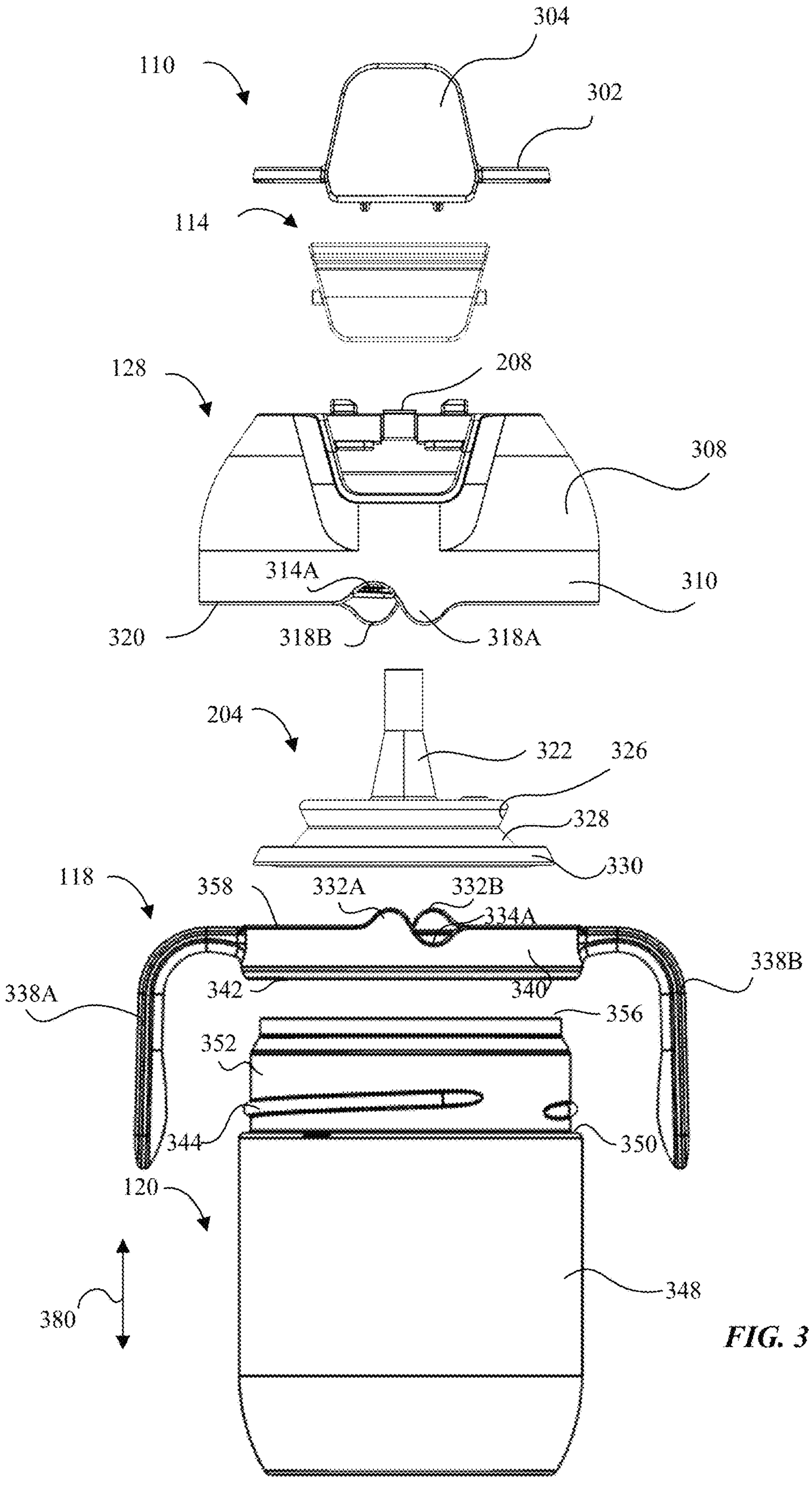
FIG. 3 is an exploded view of the drinking bottle, according to one embodiment.

FIG. 3 is an exploded view of drinking bottle 100, according to one embodiment. Drinking bottle 100 may include, among other components, lid cover 110, lid 128, insert 204, handle assembly 118 and container 120. In other embodiments, drinking bottle 100 may include additional components not illustrated in FIG. 3. Alternatively, some components illustrated in FIG. 3 may be omitted (e.g., lid cover 110). Further, modifications may be made on how the components are assembled (e.g., insert 204 may be assembled from a top surface of lid 128 instead of being assembled via the bottom of lid 128).

Lid 128 generally has side surfaces 308, 310 and is assembled on top of container 120. Side surface 308 is dome shaped while side surface 310 is cylindrically shaped. Lid 128 is formed with cavity 540 in which insert 204 may be installed. Bottom surface 320 of lid 128 contacts top surface 358 of handle assembly 118. Bottom surface 320 has notches 314A, 314B and protrusions 318A, 318B that engage with protrusions 332A, 332B and notches 334A, 334B of handle assembly 118 so that handle assembly 118 rotates with lid 128 when screwing lid 128 onto container 120 or when unscrewing lid 128 from container 120. The details of lid 128 are described below with reference to FIGS. 5A and 5B.

Lever 114 is assembled onto lid 128 so that it may pivot relative to lid 128. When pressed in, lever 114 disengages lid cover 110 and enables lid cover 110 to rotate into the open state. When lid cover 110 is pressed down towards lid 128, lever 114 engages lid cover 110 and locks lid cover 110 in the closed state. Biasing force is applied to lever 114 by insert 204 so that lever 114 returns to a locking position and remains in the position when external force (e.g., by the user pressing the lever 114) is not applied to lever 114. The details of lever 114 are described below with reference to FIGS. 7A and 7B.

Insert 204 is removably attached to lid 128 and also assists sealing of open top 356 of container 120 in conjunction with lid 128. Insert 204 is made of resilient materials and may be formed with straw 322 or spout 1208. For example, insert 204 may be made of silicone, thermoplastic elastomers, rubber or latex. By removably attaching insert 204 to lid 128, cleaning of insert 204 and lid 128 may be facilitated, and replacement of insert 204 may be performed easily when it becomes worn or damaged due to repeated use. Insert 204 includes, among other components, top portion 326, middle portion 328 and bottom portion 330. Top portion 326 contact and is supported by a forward tapered side surface 510 of lid 128 when insert 204 is assembled onto lid 128. The details of insert 204 are described below with reference to FIG. 8.

Handle assembly 118 includes ring 340 onto which handles 338A, 338B are attached. Ring 340 includes top surface 358 and bottom surface 342. In one or more embodiments, ring 340 has a bottom surface 342 that contacts step 350 of container 120 in a rotatable manner. On the other hand, handle 338 contacts bottom surface 320 of lid 128 and includes protrusions 332A, 332B and notches 334A, 334B for rotation of handle assembly 118 during screwing or unscrewing of lid 128. Handles 338A, 338B are grasped by the user during the use of drinking bottle 100. In one or more embodiments, each pair of protrusions/notches 332A, 334A, and 332B, 334B has a wave pattern.

Container 120 has first portion 352 and second portion 348 connected to first portion 352. First portion 352 has an outer diameter smaller than second portion 348, and has screw 344 formed on its outer surface. The outer diameter of first portion 352 is sufficiently small so that ring 340 of handle assembly 118 may slide onto it but the outer diameter of second portion 348 is sufficiently large so that ring 340 does not slide over it. First portion 352 and second portion 348 are separated by step 350 that contacts bottom surface 342 of handle assembly 118 in a rotatable manner. First portion 352 also has open top 356 that is sealed by insert 204, as described below in detail with reference to FIGS. 9 and 10. Although second portion 348 is illustrated in FIG. 3 as having a symmetric cylindrical shape, second portion 348 may have various other shapes as long as step 350 is circular shaped. Container 120 may have a bottom shape that enables container 120 to stay upright when placed on a flat surface.

In order to assemble drinking bottle 100, lever 114 and lid cover 110 are assembled onto lid 128. Insert 204 is then inserted from the bottom of lid 128 so that top portion 326 rests on the inner surface 510 of top portion 326. Ring 340 of handle assembly 118 is then inserted into the first portion 352 of container 120 so that bottom surface 342 rests on step 350. Finally, lid 128 is screwed onto the screw 344 of container 120.

As lid 128 is screwed onto screw 344, lid 128 moves downward along a longitudinal direction 380, notch 314A and protrusion 318A align with notch 334A and notch 334A while notch 314B and protrusion 318B align with protrusion 332B and notch 334B so that handle assembly 118 rotates with lid 128, as described below in detail with reference to FIGS. 11A and 11B. In order to disassemble drinking bottle 100, a process is taken in an order reverse to the assembling process.

Figure 4:
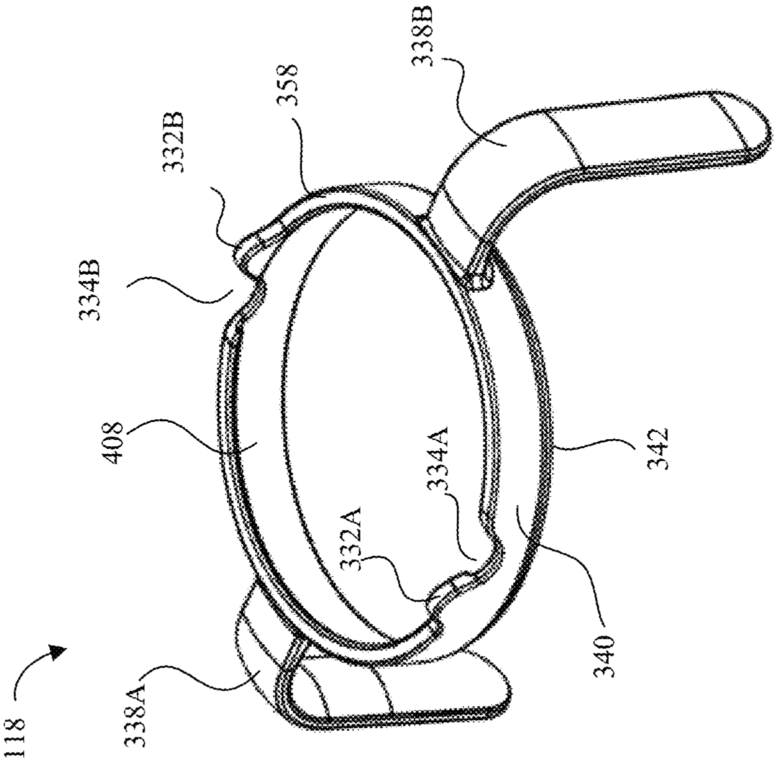
FIG. 4 is a perspective view of a handle assembly, according to one embodiment.

FIG. 4 is a perspective view of handle assembly 118, according to one embodiment. Handle assembly 118 may include, among other components, ring 340 and handles 338A, 338B placed at radially opposite sides of ring 340. Ring 340 has an inner surface 408 that is smooth and faces the first portion 352 of container 120 and an outer surface on which handles 338A, 338B are attached. Pairs of notches 334A, 334B are formed on top surface 358 at locations 90 degrees apart from handles 338A, 338B. In one or more embodiments, handles 338A, 338B extend away from ring 340 and then are curved downwards. The shape of handles in FIG. 4 is merely illustrative and handles may take various other shapes instead.

Figure 5A:
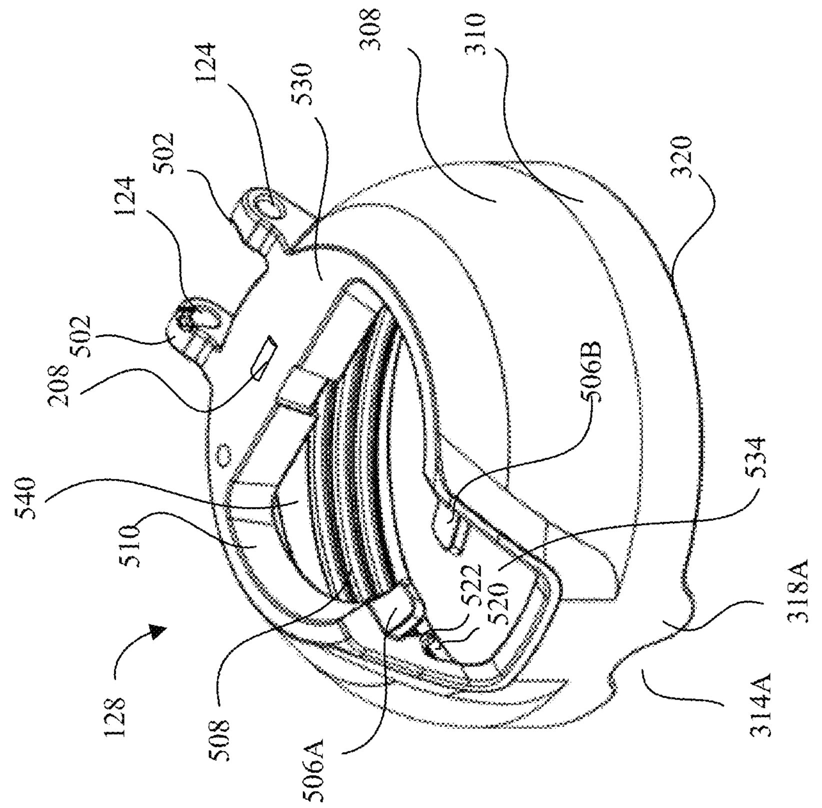
FIGS. 5A and 5B are perspective views of a lid of the drinking bottle, according to one embodiment.
Figure 5B:
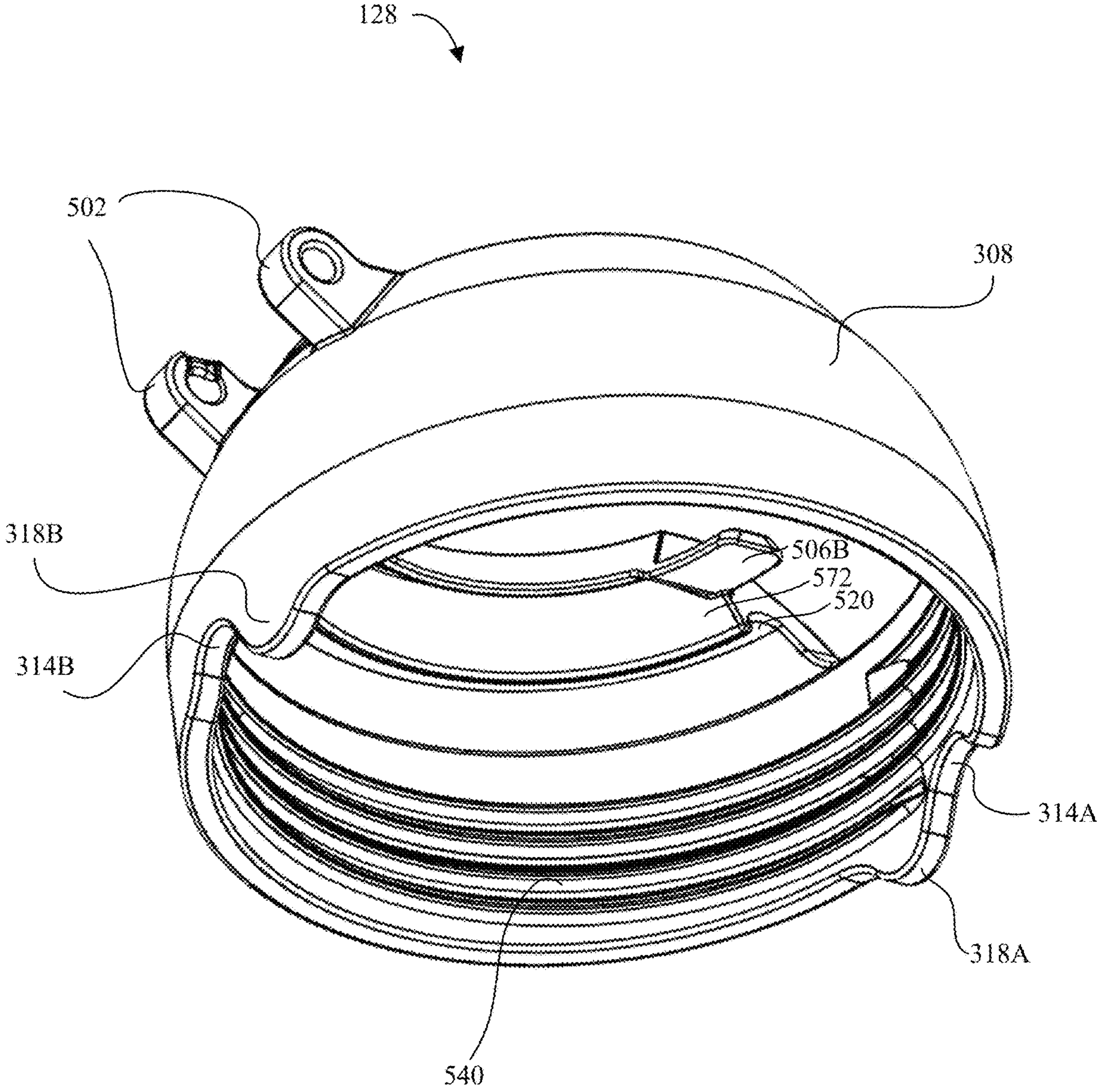

FIGS. 5A and 5B are perspective views of lid 128, according to one embodiment. Lid 128 has hinges 502 at its back and structures for securing lever 114 at its front. Hinges 502 have holes 124 formed in a horizontal direction to receive pins 602 of lid cover 110 in a rotatable manner. Lid 128 has a top surface 530 and side surface 308 extending downwards from top surface 530.

Part of top surface 530 and side surface 308 are cut away to form cavity 534 for receiving lever 114 and cavity 540 for receiving insert 204. Top surface 530 and side surface 308 also have rests 506A, 506B and latches 522. Each of rests 506A, 506B are shaped as a flat plate, and are inserted into corresponding spaces 732 of lever 114. After lever 114 is assembled onto lid 128, rests 506A, 506B enable lever 114 to slide vertically while restricting a vertical movement of lever 114. Indents 520 are formed between latches 522 and an inner surface of lid 128 to receive bottom portion 330 of insert 204 so that bottom portion 330 provides sealing between lever 114 and lid 128.

The inner surface of lid 128 is also formed with screw 508 to mate with screw 344 of container 120. In some embodiments, top surface 530 is also provided with protrusion 208 that may provide compressive force to open lid cover 110 when lever 114 is pressed. Bottom surface 320 of lid 128 has pairs of notches 314 and protrusions 318 at locations corresponding to those of protrusions 332 and notches 334 of handle assembly 118. Frustoconical surface 572 is provided at the upper part of the inner surface of lid 128. Latches 708 of lever 114 are locked onto frustoconical surface 572 when lever 114 is assembled onto lid 128.

Figure 6:
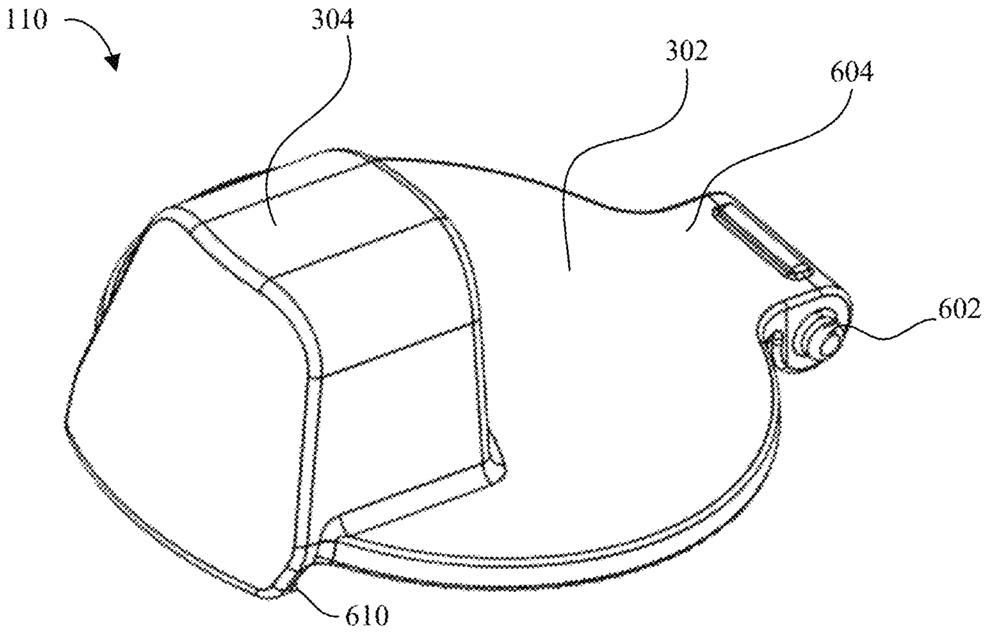
FIG. 6 is a perspective view of a lid cover of the drinking bottle, according to one embodiment.

FIG. 6 is a perspective view of lid cover 110, according to one embodiment. Lid cover 110 may include flat portion 302 and housing 304 extending upward from flat portion 302. End portion 604 extends backward from flat portion 302 and is formed with pins 602 for attaching to lid 128 in a rotatable manner.

At a bottom edge of housing 304, rib 610 is formed to latch onto groove 702 of lever 114 in the closed state. When lever 114 is pressed, rib 610 is released from groove 702 and enables lid cover 110 to rotate about pins 602 into the open state. Housing 304 has an internal space that can compress or fold and receive straw 322 or spout 1208 in the closed state. The compression or folding of straw 322 or spout 1208 in housing 304 provides force to open lid cover 110 in a popping manner, as described below in detail with reference to FIGS. 12A through 12D. Further, folding of straw 322 further advantageously prevents contents in container 120 from leaking out through the straw 122 when the lid cover 110 is closed.

Figure 7A:
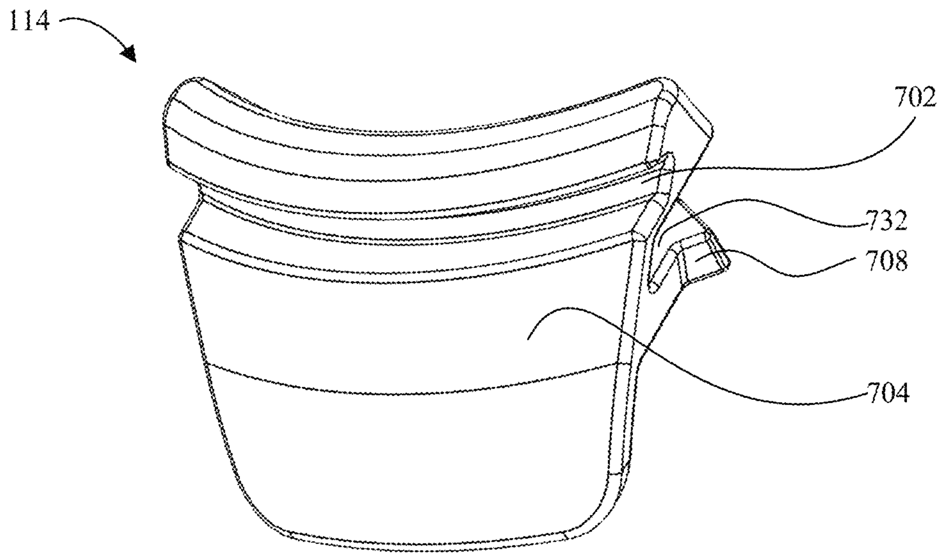
FIGS. 7A and 7B are perspective views of a lever of the drinking bottle, according to one embodiment.
Figure 7B:
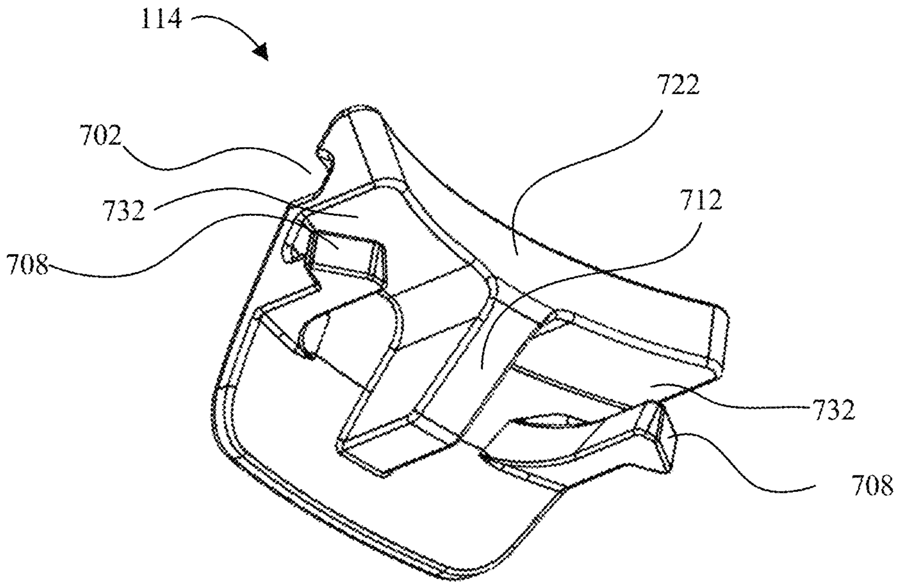

FIGS. 7A and 7B are perspective views of lever 114, according to one embodiment. Lever 114 includes front plate 704 that is formed with groove 702. When front plate 704 is pressed, latches 708 of lever 114 slides horizontally relative to rests 506A, 506B while the vertical movement of lever 114 is restricted by rests 506A, 506B. In this way, lid 128 releases rib 610 of lid cover 110, which pops open lid cover 110. When closing lid cover 110, rib 610 of lid cover 110 slides down an upper portion of front plate 704 and is received in groove 702 in a latching manner. Latches 708 extend backward symmetrically at a rear side of lever 114.

By pressing latches 708 inwards, lever 114 may be disassembled from lid 128. Lever 114 also includes horizontal rib 722 and vertical rib 712 at its back to provide rigidity and strength to lever 114. Further, horizontal rib 722 contacts top portion 326 of insert 204 while vertical rib 712, in conjunction with horizontal rib 722, contacts middle portion 328 of insert 204 so that insert 204 applies biasing force to lever 114. The structure of lever 114 in FIGS. 7A and 7B is merely illustrative, and various modifications may be made to lever 114. For example, lever 114 may have a different exterior shape, have more ribs than what is shown in FIG. 7B, and mechanisms other than latches 708 may be used for attaching to lid 128.

Lever 114 is pressed by insert 204 so that lever 114 is biased into a position where groove 702 is shifted forward by insert 204. Because insert 204 is made of resilient material, insert 204 may provide biasing force to lever 114 so that groove 702 of lever 114 remains and is biased into a position that locks rib 610 of lid cover 110 in a closed state when lever 114 is not pressed by the user. For this purpose, lever 114 has horizontal rib 722 and vertical rib 712 that contacts middle portion 328 of insert 204, and a horizontal rib 722 that contact top portion 326 of insert 204. Because insert 204 provides the biasing force to insert 204, no separate biasing mechanism such as spring is used to push lever 114 into the locking position. Such use of insert 204 as a biasing mechanism beneficially reduces the number of parts and complexity of the assembly.

Figure 8:
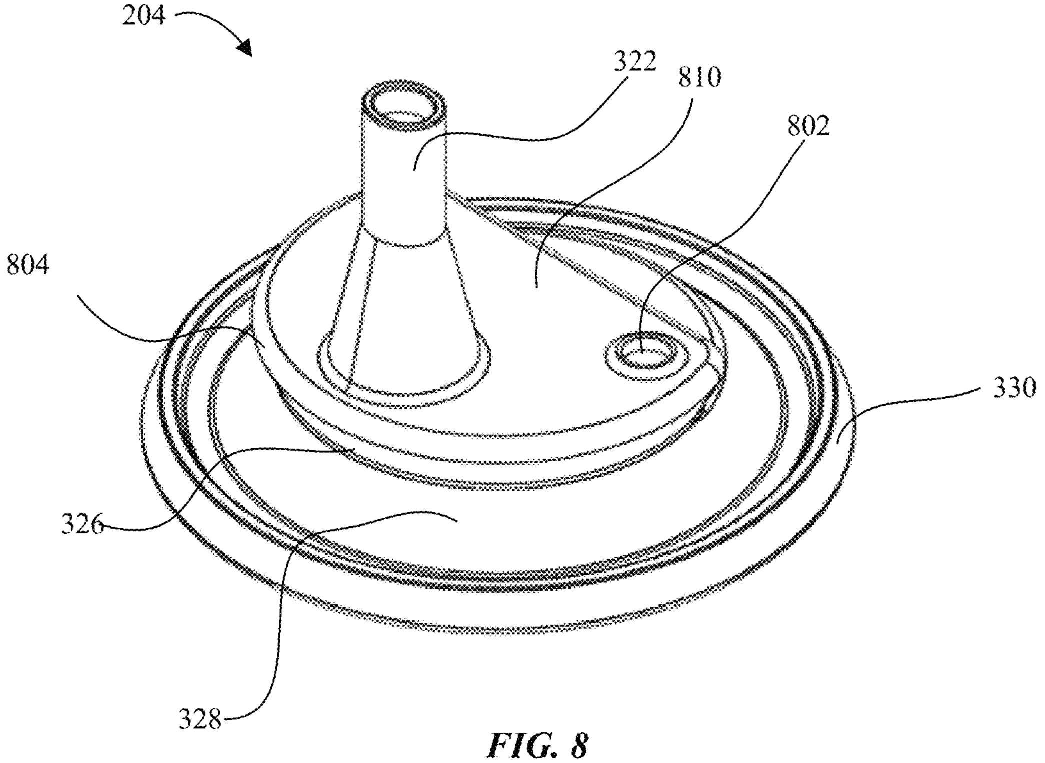
FIG. 8 is a perspective view of an insert, according to one embodiment.

FIG. 8 is a perspective view of insert 204, according to one embodiment. In the embodiment of FIG. 8, straw 322 extends from top surface 810. In other embodiments, other structures (e.g., spout 1208) may extend from top surface 810. Slanted surface 804 extends in a forward tapered manner from top surface 810 and rests on an inner surface 510 of lid 128 when insert 204 is assembled onto lid 128. Air vent 802 is formed on top surface 810 to enable liquid in container 120 to flow out of straw 322 (or spout 1208) despite open top 356 being sealed by insert 204 and lid 128. Insert 204 includes bottom portion 330 with upper surface, top portion 326, and middle portion 328 between bottom portion 330 and top portion 326. Top portion 326 is reverse tapered.

Insert 204 is pushed upward from the bottom of lid 128 for mounting onto lid 128. The top part of top portion 326 has a large dimension than that of cavity 540. By supplying sufficient upward force, top portion 326 deforms and snaps into cavity 540. After inserting top portion 326 into cavity 540, the side surface that is reverse tapered rests on inner surface 510 of lid 128 and restricts a downward movement of insert 204. The upward movement of insert is also restricted by middle portion 328 that has a larger dimension than that of cavity 540. The side surface of middle portion 328 is forward tapered.

Figure 9:
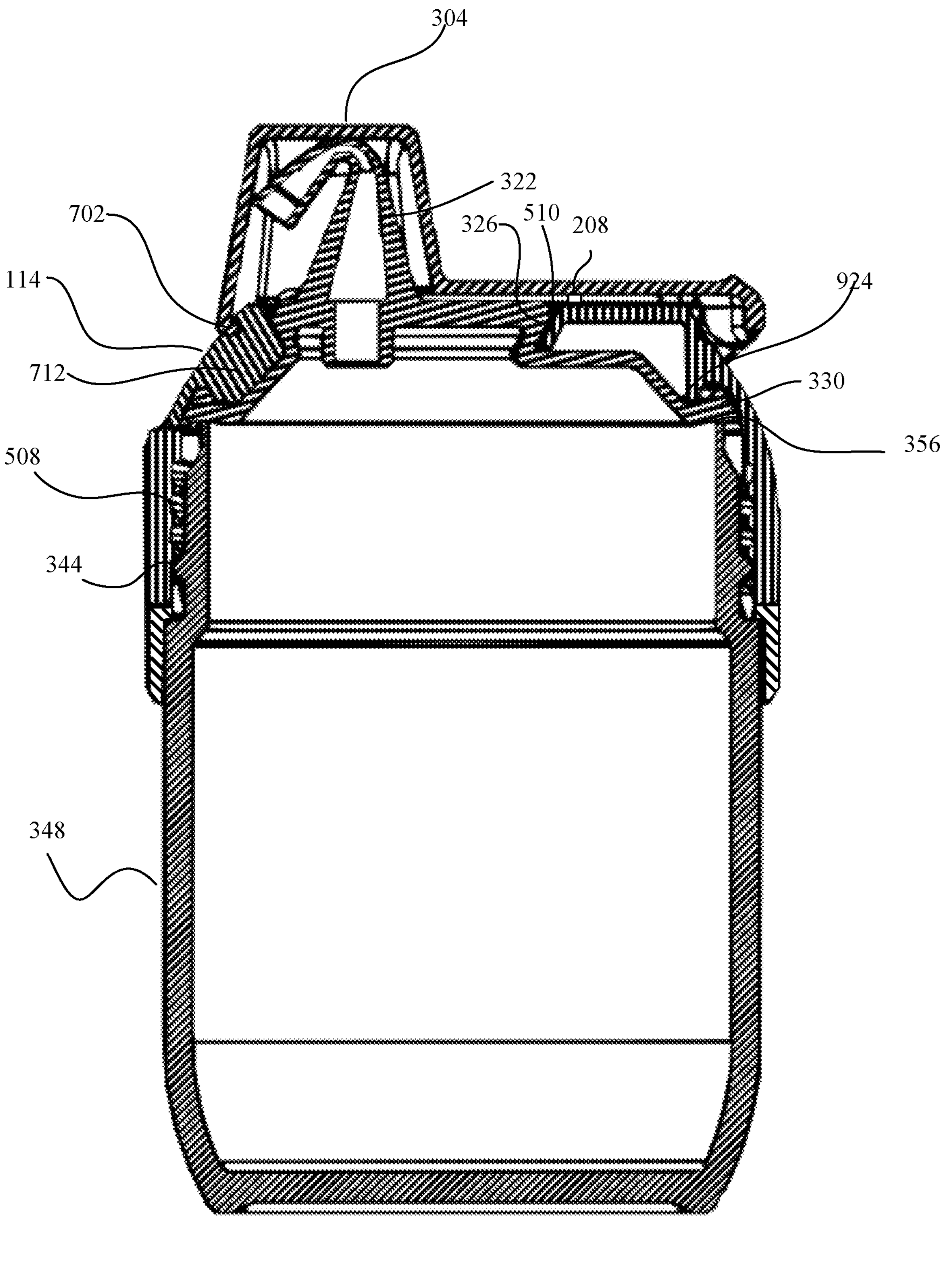
FIGS. 9 and 10 are cross-sectional views of the drinking bottle taken along A-A' line and B-B' lines of FIG. 1, respectively, according to one embodiment.
Figure 10:
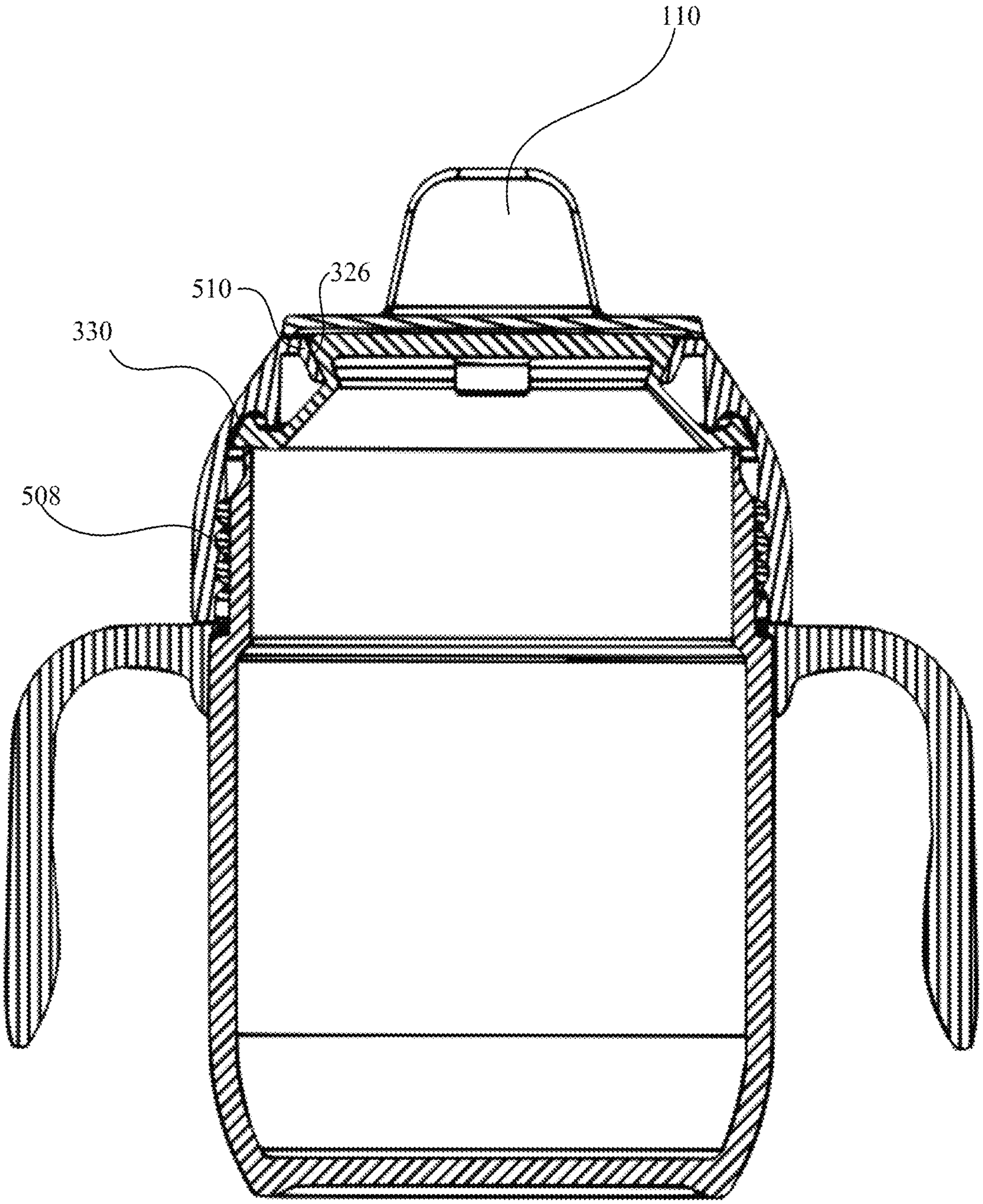

FIGS. 9 and 10 are cross-sectional views of drinking bottle 100, according to one embodiment. When lid cover 110 is closed, straw 322 is compressed or folded and received in interior space of housing 304 of lid cover 110. This provides compressive force to open lid cover 110 when lever 114 is pressed and rib 610 is released from groove 702.

Bottom portion 330 of insert 204 is compressed between inner annular rib 924 that is formed at the bottom of lid 128 and open top 356 of container 120. Bottom portion 330 is made of resilient material, and hence, bottom portion 330 seals open top 356 when lid 128 is screwed onto container 120 so that the liquid in container 120 is not leaked.

Vertical rib 712 of lever 114 presses down and deforms bottom portion 330 when lever 114 is installed onto lid 128. Since bottom portion 330 is made of resilient material and is deformed, it provides elastic force to push lever 114 towards the left in FIG. 9. Accordingly, bottom portion 330 pushes vertical rib 712 by a predetermined amount of force that must be overcome by the user to release lid cover 110. By biasing lever 114 with the predetermined amount of force, inadvertent or accidental opening of lid cover 110 may be prevented.

Figure 11A:
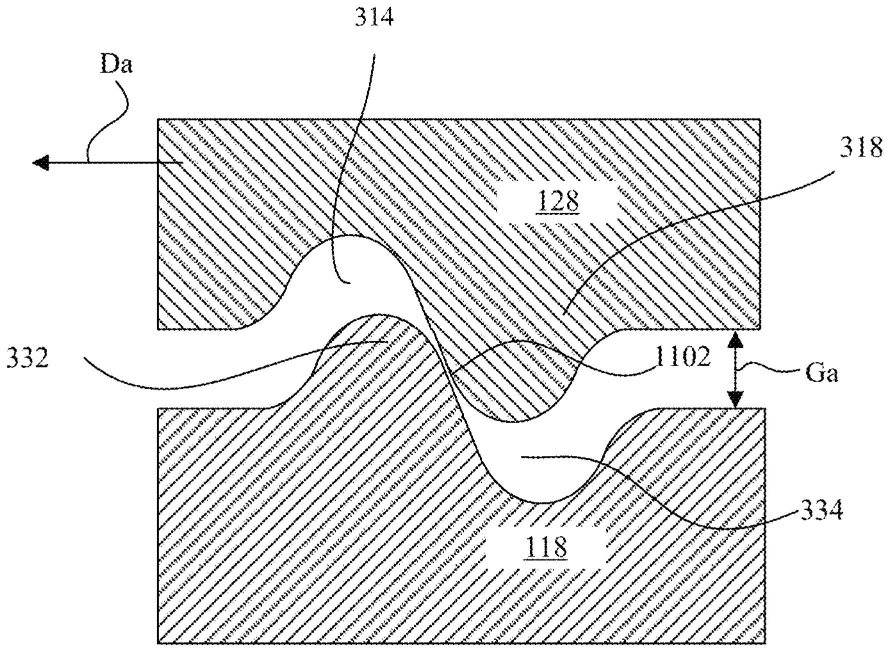
FIGS. 11A through 11D are diagrams illustrating operations of screwing the lid onto or unscrewing the lid from a container, according to one embodiment.
Figure 11B:
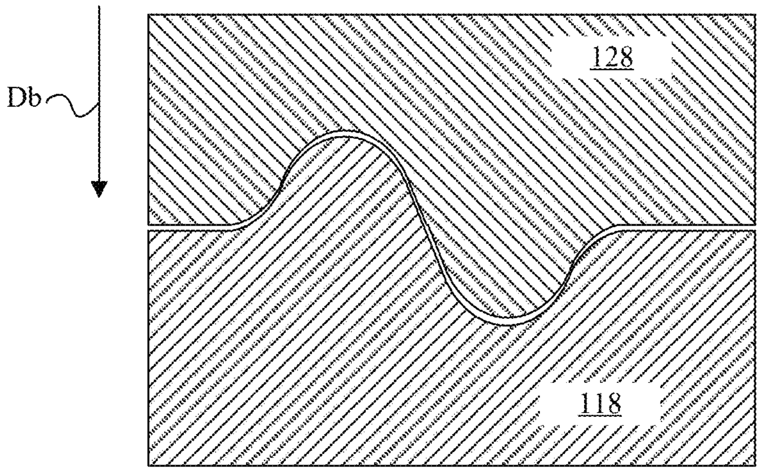

FIGS. 11A and 11B are diagrams illustrating the operations of lid 128 and handle assembly 118 during screwing of lid 128 onto container 120, according to one embodiment. As shown in FIG. 11A, when lid 128 is rotated to move the illustrated portion of lid 128 in direction Da, pairs of protrusion and notch at lid 128 and protrusion 318 make contact at point 1102. Hence, protrusion 318 pushes protrusions 332 and causes handle assembly 118 to rotate along with notch 314.

As lid 128 is rotated, lid 128 moves downward as in direction Db as shown in FIG. 11B until gap Ga between lid 128 and handle assembly 118 is substantially zero. After gap Ga become substantially zero, lid 128 is fully screwed onto container 120 and no further rotation may be made in the direction indicated by direction Da. In this way, lid 128 and handle assembly 118 are always positioned at certain relative angles when lid 128 are screwed onto container 120.

Because straw 322 or spout 1208 is offset towards the front of lid 128 and handle 338 are located 90 degrees apart from the pairs of protrusion and indents on ring 340, protrusion 332 or spout 1208 is always biased in a direction 90 degrees rotated from handle 338. This enables the user to conveniently grasp handle 338 with protrusion 332 or spout 1208 offset toward the user's mouth for convenient consumption of liquid in container 120.

Figure 11C:
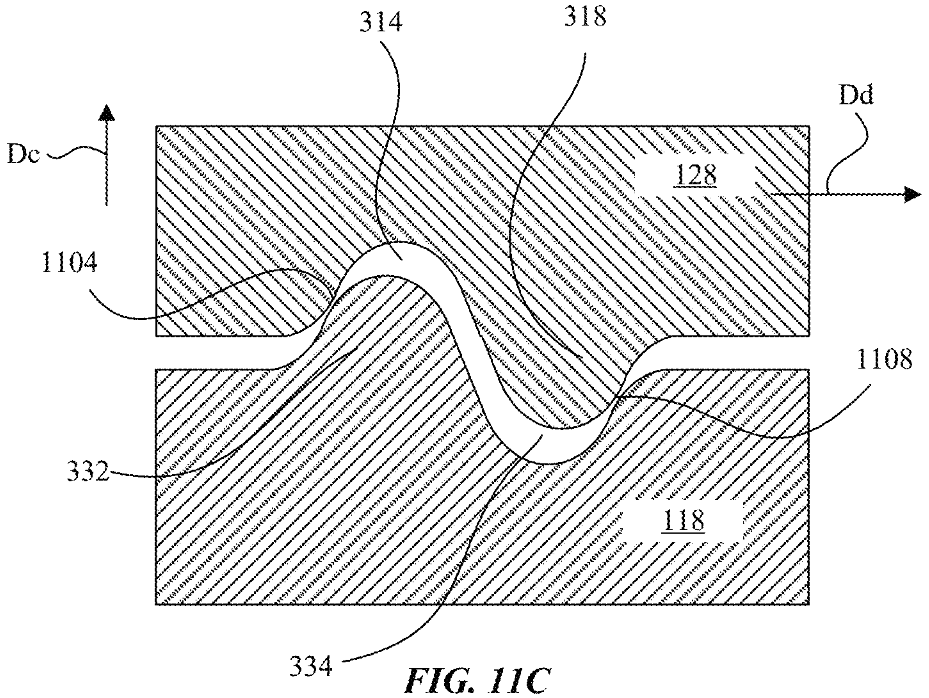
Figure 11D:
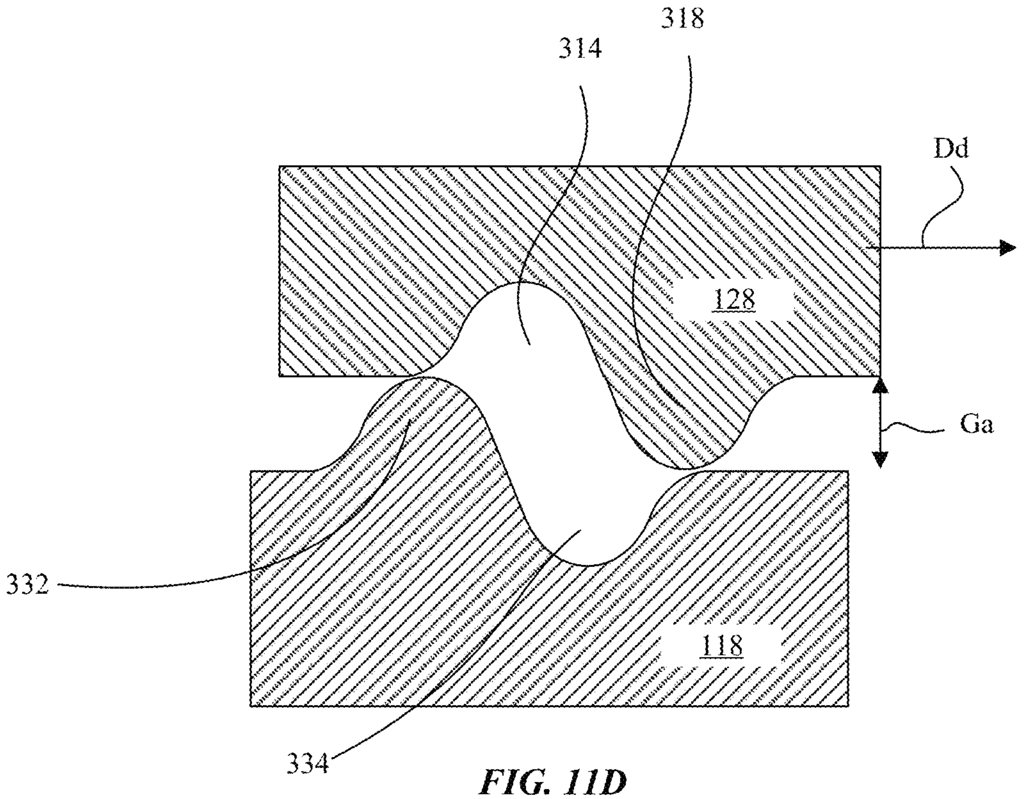

FIGS. 11C and 11D are diagrams illustration the operation of lid 128 and handle assembly 118 during unscrewing of lid 128 from container 120, according to one embodiment. When lid 128 is rotated so that a portion of lid 128 shown in FIG. 11C moves in direction Dd, protrusion 332 of handle assembly 118 contacts notch 314 of lid 128 at point 1104, and notch 334 of handle assembly 118 contacts protrusion 318 of lid 128 at point 1108 to rotate handle assembly 118 in direction Dd. As lid 128 is rotated, lid 128 moves in direction Dc until gap Ga between lid 128 and handle assembly 118 are sufficiently large so that protrusion 318 and protrusion 332 no longer make contact at any points on notch 314 and notch 334, respectively, as show in FIG. 11D. Then, lid 128 may be fully unscrewed from container 120 without rotating handle assembly 118.

Figure 12A:
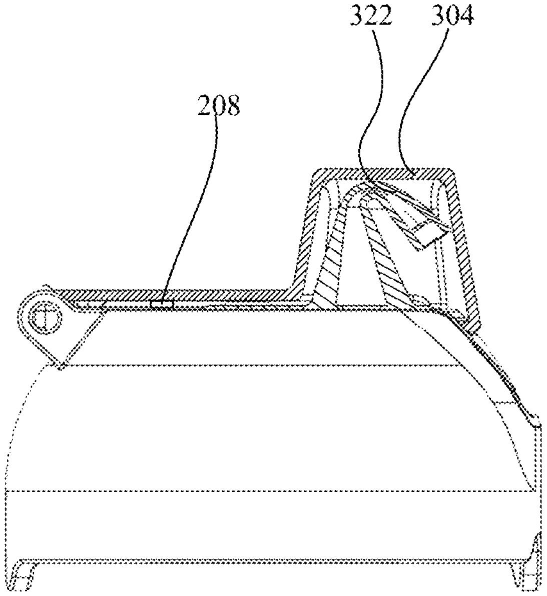
FIGS. 12A through 12D are diagrams illustrating opening of the lid cover by the compressive force of the straw or a spout, according to one embodiment.
Figure 12B:
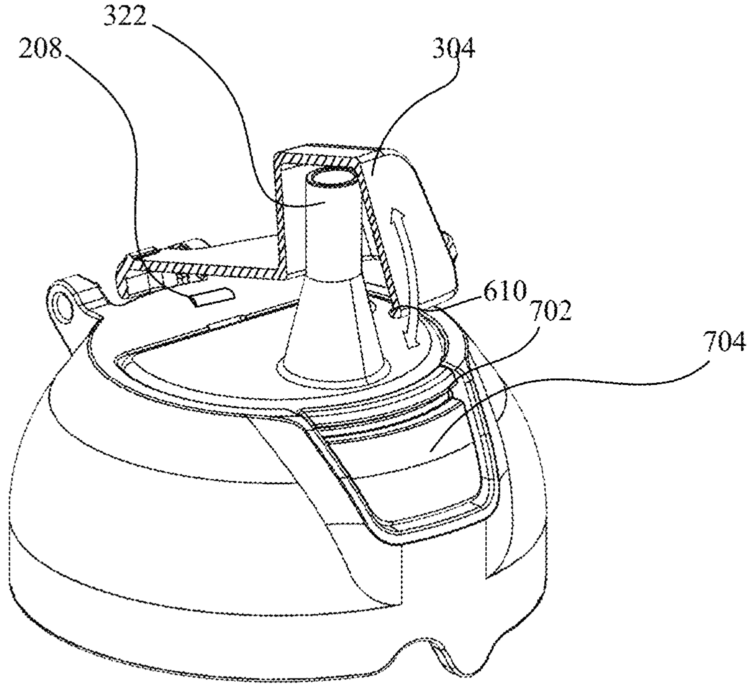

FIGS. 12A and 12B are diagrams illustrating opening of lid cover 110 by the compressive force of folded straw 322, according to one embodiment. When lid cover 110 is closed, straw 322 is compressed or folded within interior space of housing 304. The compressed/folded straw 322, hence, exerts a force on the bottom of housing 304 so that lid cover 110 pops up and rotates about holes 124 when front plate 704 is pressed. In one or more embodiments, such force may be increased by providing protrusion 208 on the top surface of lid 128.

Figure 12C:
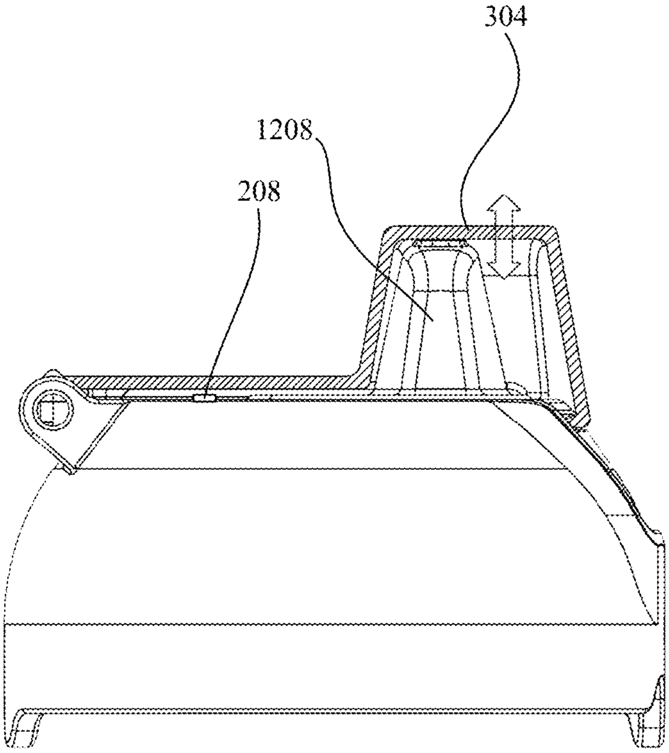
Figure 12D:
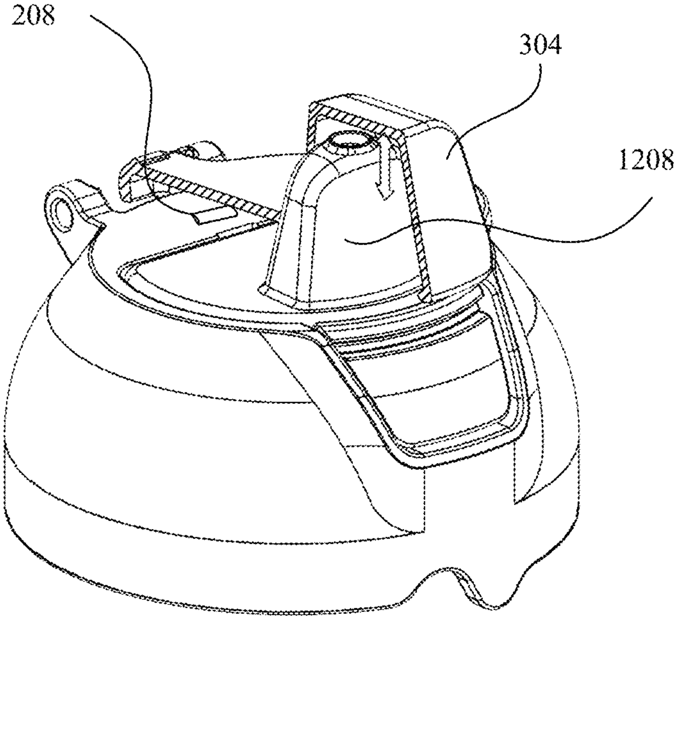
Figure 13A:
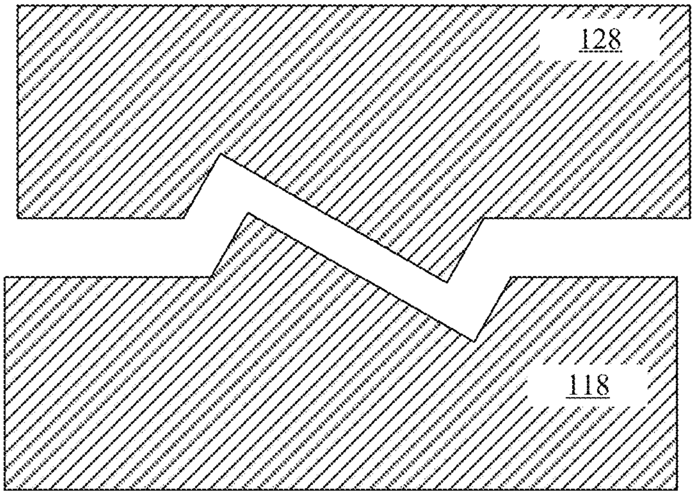
FIG. 13A through 13D are diagrams illustrating various shapes of notches and protrusions, according to various embodiments.
Figure 13B:
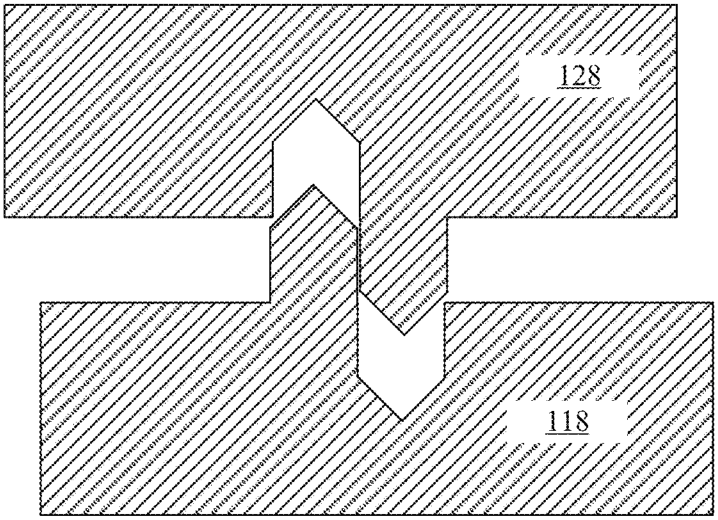
Figure 13C:
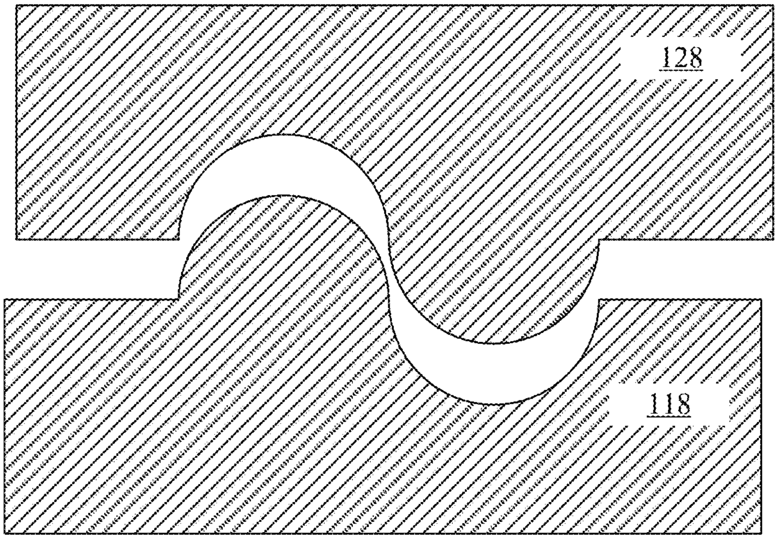
Figure 13D:
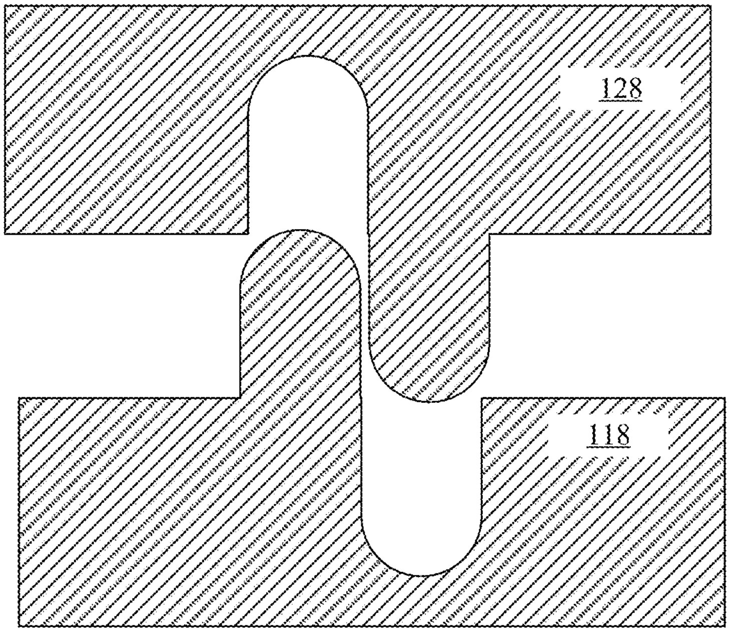

FIGS. 12C and 12D are substantially identical to FIGS. 12A and 12B, except that spout 1208 is provided on insert 204 instead of straw 322. In the embodiments of FIGS. 12C and 12D, spout 1208 is compressed by housing 304 when lid cover 110 is closed, and therefore, exerts a force on the bottom of housing 304 so that lid cover 110 pops open when front plate 704 is pressed. Insert 204 may be provided with various other mechanisms for consuming liquid in drinking bottle 100, other than straw 322 and spout 1208.

Although above embodiments are described with reference to two pairs of curved protrusions and notches with inverse shapes in lid 128 and handle assembly 118, protrusions and notches with straight lines, zigzagged shapes, or other configurations may also be used. Some example shapes of protrusions and corresponding shapes of notches are illustrated in FIGS. 13A through 13D.

Although the present disclosure has been described above with respect to several embodiments, various modifications can be made within the scope of the disclosure. Accordingly, the disclosure described above is intended to be illustrative, but not limiting.

What is claimed is:

1. A method of operating a drinking bottle, comprising:

receiving, in a ring of a handle assembly, a first portion of a container with an open top, the first portion having a first outer dimension;

slidably engaging a second portion of the container with the ring of the handle assembly, the second portion having a second outer dimension larger than the first outer dimension and further away from the open top than the first portion, the handle assembly comprising at least one handle attached to the ring;

receiving, in a lid, the first portion of the container but not the second portion of the container;

engaging a first protrusion of the ring with a second protrusion of the lid, the first protrusion protruding along an axial direction of the ring and the second protrusion protruding along the axial direction; and screwing the lid onto the container with the ring between the lid and the container that causes (i) the first protrusion of the ring to be pushed by the second protrusion of the lid, (ii)

the first protrusion of the ring to be gradually moved into a first notch of the lid, and (iii) the second protrusion of the lid to be moved gradually into a second notch of the ring so that the at least one handle of the ring is oriented in a predetermined direction relative to the lid after the lid is screwed onto the container.

2. The method of claim 1, wherein an inner dimension of the ring is larger than the first outer dimension but smaller than the second outer dimension, and wherein an outer surface of a front part of the ring formed with the first protrusion of the ring is flush with an outer surface of the lid when the lid is screwed to the container.

3. The method of claim 1, wherein the lid is screwed onto the container by engaging a first screw of the first portion with a second screw of the lid.

4. The method of claim 3, further comprising:

unscrewing the lid from the container that causes the second notch of the ring to be pushed by the second protrusion of the lid and gradually move the second protrusion away from the second notch in the axial direction so that the ring and the lid are released from the container.

5. The method of claim 3, wherein an internal surface of the ring is smooth.

6. The method of claim 1, wherein the ring comprises a third protrusion at an opposite side of the first protrusion, and the lid comprises a third notch that corresponds to the third protrusion at the opposite side of the first protrusion, wherein a first upper surface of the ring between the first protrusion and the third notch is flat, and wherein a second upper surface between the second notch and the third protrusion is flat.

7. The method of claim 1, further comprising assembling an insert comprising a straw or spout into a cavity in the lid, the insert made of resilient material to provide sealing between the open top and the lid.

8. The method of claim 7, wherein the insert comprises:

a top portion having an outer surface that is reverse tapered, the outer surface of the top portion engaging and resting on a forward tapered inner surface of the cavity in the lid, a middle portion attached to the top portion and having an outer surface that is forward tapered, and a bottom portion attached to the middle portion, edges of the bottom portion captured between an inner annular rib of the lid and the open top of the container.

9. The method of claim 7, further comprising compressing the straw or spout of the insert between the lid and a lid cover hinged to the lid by closing the lid cover.

10. The method of claim 9, further comprising:

locking the lid cover in a first position by a lever attached to the lid; and releasing the lid cover in a second position, the lid cover rotated away from the lid by a compressive force of the insert when the lever is placed in the second position.

11. The method of claim 10, wherein the lever comprises a pair of latch for securing the lever to the lid.

12. The method of claim 10, further comprising applying biasing force to the lever by the insert to maintain the lever in the first position when external force is not applied to the lever.

13. The method of claim 9, further comprising accessing content in the container via the straw or the spout that is folded or compressed by a housing of the lid cover when the lid cover is closed.

14. The method of claim 13, further comprising applying a compressive force that opens the lid cover by the straw or the spout.

15. The method of claim 10, further comprising:

compressing a protrusion of the lid by the lid cover when the lid cover is closed; and applying an opening force to the lid cover by the protrusion when the lever is placed in the second position.

16. A method of operating a drinking bottle, comprising:

rotating a lid relative to a container to screw the lid onto the container;

mating a first protrusion and a first notch of a handle assembly with a second notch and a second protrusion of the lid, and a third protrusion and a third notch of the handle assembly with a fourth notch and a fourth protrusion of the lid, the second notch and the second protrusion inverse in shape relative to the first protrusion and the first notch, the fourth notch and the fourth protrusion inverse in shape relative to the third protrusion and the third notch, wherein the first protrusion, and the second protrusion, the third protrusion and the fourth protrusion extending in a longitudinal direction of the container, wherein a first upper surface of the handle assembly between the first protrusion and the third notch, and a second upper surface of the handle assembly between the first notch and the third protrusion are flat;

reducing a distance between the handle assembly and the lid in the longitudinal direction by rotating the handle assembly engaged with the lid; and locking the handle assembly in a predetermined rotational position relative to the lid by reducing a first gap between the first protrusion and the second notch and a second gap between the second protrusion and the first notch responsive to screwing of the lid onto the container and rotating of the handle assembly.

17. The method of claim 16, where an inner surface of the lid comprises a first screw and an outer surface of the container comprises a second screw that mate with the first screw.

18. The method of claim 16, further comprising:

assembling an insert of resilient material onto the lid;

locking a lid cover in a first position responsive to a lever attached to the lid receiving a biasing force from the insert when external force is not applied to the lever; and releasing the lid cover into a second position responsive to the lever receiving the external force.

* * * * *